United States Patent
Takishima (10) Patent No.: US 6,650,604 B1
(45) Date of Patent: Nov. 18, 2003

(54) OPTICAL HEAD OF DISK DRIVE

(75) Inventor: Suguru Takishima, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/217,813

(22) Filed: Dec. 22, 1998

(30) Foreign Application Priority Data

Dec. 27, 1997 (JP) .............................................. 9-368021
Dec. 27, 1997 (JP) .............................................. 9-368022

(51) Int. Cl.⁷ ................................................ G11B 7/00
(52) U.S. Cl. ................................ 369/44.19; 369/44.14; 369/119
(58) Field of Search ........................... 369/44.14, 44.17, 369/44.18, 44.19, 44.22, 44.29, 44.41, 112.01, 112.26, 119

(56) References Cited

U.S. PATENT DOCUMENTS

| | | |
|---|---|---|
| 2,750,461 A | 6/1956 | Bunch |
| 3,244,917 A | 4/1966 | Gute |
| 3,354,833 A | 11/1967 | Laing |
| 4,088,914 A | 5/1978 | Aoki |
| 4,126,796 A | 11/1978 | Ito |
| 4,206,379 A | 6/1980 | Owda |
| 4,285,566 A | 8/1981 | Yamamoto |
| 4,297,713 A | 10/1981 | Ichikawa et al. |
| 4,351,596 A | 9/1982 | Ohniwa et al. |
| 4,466,088 A | 8/1984 | Trethewey |
| 4,688,201 A | 8/1987 | Towner et al. |
| 4,712,887 A | 12/1987 | Baer |
| 4,891,998 A | 1/1990 | Tourville |
| 4,959,824 A | 9/1990 | Ueda |
| 4,968,876 A | 11/1990 | Iima |

(List continued on next page.)

FOREIGN PATENT DOCUMENTS

| | | |
|---|---|---|
| EP | 0084727 | 8/1983 |
| EP | 0084728 | 8/1983 |
| EP | 0448362 | 9/1991 |
| EP | 0790512 | 8/1997 |
| EP | 0907163 | 4/1999 |
| GB | 378922 | 8/1932 |
| GB | 1314002 | 4/1973 |
| GB | 1457995 | 12/1976 |
| GB | 2000604 | 1/1979 |
| GB | 2086092 | 5/1982 |
| GB | 2193341 | 2/1988 |
| JP | 62262017 | 11/1987 |
| JP | 64-2015 | 1/1989 |
| JP | 5128561 | 5/1993 |
| JP | 8315404 | 11/1996 |
| WO | 90/08363 | 7/1990 |
| WO | 98/06095 | 2/1998 |
| WO | 98/49675 | 11/1998 |
| WO | 98/49684 | 11/1998 |

OTHER PUBLICATIONS

Patent Abstracts of Japan, vol. 012, No. 140 (P–696), dated Apr. 18, 1988.
Patent Abstracts of Japan, vol. 017, No. 505 (P–1611), dated Sep. 10, 1993.

(List continued on next page.)

*Primary Examiner*—Muhammad Edun
(74) *Attorney, Agent, or Firm*—Greenblum & Bernstein, P.L.C.

(57) ABSTRACT

An optical head includes (1) a stationary optical unit fixed to a body of the optical disk drive, (2) a rotary arm rotatable along a surface of the optical disk, which carries an object lens which converges the light on the optical disk, and (3) a light-introducing system which directs the light from the light source module to the rotary arm so that the light proceeds in the rotary arm to reach the object lens.

18 Claims, 11 Drawing Sheets

U.S. PATENT DOCUMENTS

| | | |
|---|---|---|
| 5,125,750 A | 6/1992 | Corle et al. |
| 5,126,899 A | 6/1992 | Kanazawa |
| 5,136,559 A | 8/1992 | Nakayama |
| 5,151,890 A | 9/1992 | Yonekubo |
| 5,153,870 A * | 10/1992 | Lee et al. ............... 369/44.17 |
| 5,220,550 A | 6/1993 | Nakayama |
| 5,254,893 A | 10/1993 | Ide |
| 5,365,504 A | 11/1994 | Noguchi |
| 5,420,848 A | 5/1995 | Date et al. |
| 5,422,872 A * | 6/1995 | Hsu et al. .................. 369/119 |
| 5,444,683 A | 8/1995 | Ishikawa |
| 5,461,498 A | 10/1995 | Iwao |
| 5,517,474 A | 5/1996 | Takamine |
| 5,532,480 A | 7/1996 | Scofield |
| 5,564,585 A | 10/1996 | Saitoh |
| 5,596,446 A | 1/1997 | Plesko |
| 5,608,280 A | 3/1997 | Tamemoto et al. |
| 5,610,752 A | 3/1997 | Hayakawa |
| 5,625,244 A | 4/1997 | Bradfield |
| 5,684,762 A | 11/1997 | Kubo |
| 5,705,868 A | 1/1998 | Cox et al. |
| 5,719,834 A | 2/1998 | Futagawa et al. |
| 5,764,613 A | 6/1998 | Yamamoto |
| 5,768,241 A | 6/1998 | Kanazawa et al. |
| 5,844,676 A | 12/1998 | Southam et al. |
| 5,886,438 A | 3/1999 | Kawanishi |
| 5,920,140 A | 7/1999 | Nakagishi et al. |

OTHER PUBLICATIONS

An article entitled "Optical Magnetic Disk Device Of U.S. TeraStor Succeeds Tracking Control—Track Pitch Of 0.34 μm Realized Using Two–Stage Servo", which appeared at pp. 13 and 14 of the Japanese language magazine *Nikkei Electronics*, Sep. 22, 1997 (No. 699).

An article entitled "Trillions Of Bytes", by Eric Nee, which appeared in the Mar. 24, 1997 issue of Forbes magazine.

A screen capture of a page from TeraStor's website (dated Mar. 19, 1997) entitled "Architecture of TeraStor's Near–Field Technology".

An article entitled "In 1998, 10 GB Per Inch$^2$ Is Realized Using New Optical Recording Technology", appeared at pp. 148–151 of the Sep., 1997 Japanese language edition of Nikkei Byte magazine.

An artice by B.D. Terris et al., entitled "Near–Filed Optical Data Storage", Applied Physics Letters, vol. 68, Jan. 8, 1996.

* cited by examiner

OPTICAL HEAD OF DISK DRIVE

BACKGROUND OF THE INVENTION

This invention relates to an optical disk drive and an optical head used therein.

Generally, an optical disk drive has an optical head for writing data on and/or reading data from an optical disk. The optical head includes a rotary arm which is rotatable along a surface of the optical disk. The rotary arm carries a light source module that emits light and an object lens that converges the light on the optical disk.

However, since the light source module is mounted on the rotary arm (as well as the object lens), the rotary arm is relatively heavy. It prevents an improvement of accessing speed of the rotary arm.

Further, there is an optical head including a pair of rotary arms respectively faced with both surfaces of a 'double-sided' optical disk. In such an optical head, each rotary arm carries its own light source module and object lens. Thus, the rotary arms are relatively heavy.

SUMMARY OF THE INVENTION

It is therefore an object of the present invention to lighten a rotary arm of an optical head.

For the above object, according to one aspect of the present invention, there is provided an optical head including (1) a stationary optical unit fixed to a stationary part of an optical disk drive, including a light source module which emits light, (2) a rotary arm which is rotatable along an optical disk, which carries an object lens which converges the light on the optical disk, and (3) a light-introducing system which introduces the light from the light source module to the rotary arm so that the light proceeds in the rotary arm and reaches the object lens.

As constructed above, since the light source module is not mounted on the rotary arm but mounted on a stationary part of the optical head, the rotary arm (movable part of the optical disk) is lightened. It is advantageous in an improvement of the accessing speed of the optical head.

In a particular arrangement, the light-introducing system comprising a first reflection mirror which reflects the light from the light source module to a direction toward the rotary arm. The light-introducing system includes a second reflection mirror provided to the rotary arm, which reflects the light from the first reflection mirror to an optical path of the rotary arm. The light path between the first and second reflection mirrors is aligned with the rotation axis of the rotary arm.

Due to the first and second reflection mirrors, the light from the light source module is introduced into the rotary arm, irrespective of the rotational position of the rotary arm.

In a further development, the first reflection mirror is a so-called galvano mirror which is rotatable about an axis positioned on a reflection surface thereof. By rotating the galvano mirror, an incident angle on the object lens is varied by a rotation of the galvano mirror, so that a light spot formed on the optical disk is minutely moved. With this, a fine tracking operation is accomplished. With such an arrangement, one mirror is commonly used for the fine tracking operation and for the introduction of the laser beam to the rotary arm.

Advantageously, the rotary arm carries at least two relay lenses. The relay lenses are provided between the first reflection mirror and the object lens to obtain a conjugate relationship between a principal plane of the objective lens and a rotation axis of the first reflection mirror. With this, the laser beam reflected by the first reflection mirror is surely enter the objective lens irrespective of the rotating of the first reflection mirror.

In a preferred embodiment, the rotary arm is positioned between the stationary optical unit and the optical disk in the direction of the rotation axis of the rotary arm. It is alternatively possible that the rotary arm and the stationary optical unit are located at the same side of the optical disk.

In another aspect of the present invention, there is provided an optical head including (1) an optical unit including a light source module which emits light, (2) at least a pair of rotary arms that are rotatable along the optical disk, each of which carries an object lens which converges the light on the optical disk, and (3) a switching system which selectively introduces the light from the light source module to one of the rotary arms, so that the light proceeds in the selected rotary arm.

With such an arrangement, since a common light source module can be used for two rotary arms, the rotary arms are lightened. It is advantageous in an improvement of the accessing speed. Further, since at least one light source module is not needed, the number of optical elements is reduced.

It is advantageous that the optical unit is fixed to a stationary part of the optical disk drive. With this, the rotary arms are further lightened. In particular, the rotary arms are mounted in a rotatable carriage.

In a preferred embodiment, the switching system including (1) a first reflection mirror provided to the optical unit, which reflects the light from the light source module, and (2) second reflection mirrors respectively provided to the rotary arms, each of which is able to reflect the light from the first reflection mirror to a direction along a longitudinal direction of the rotary arm. The light path between the first reflection mirror and each of the second reflection mirrors is aligned with the rotation axis of the rotary arms.

DESCRIPTION OF THE PREFERRED EMBODIMENT

The embodiments of the optical head according to the present invention are described below.

Figure 1:
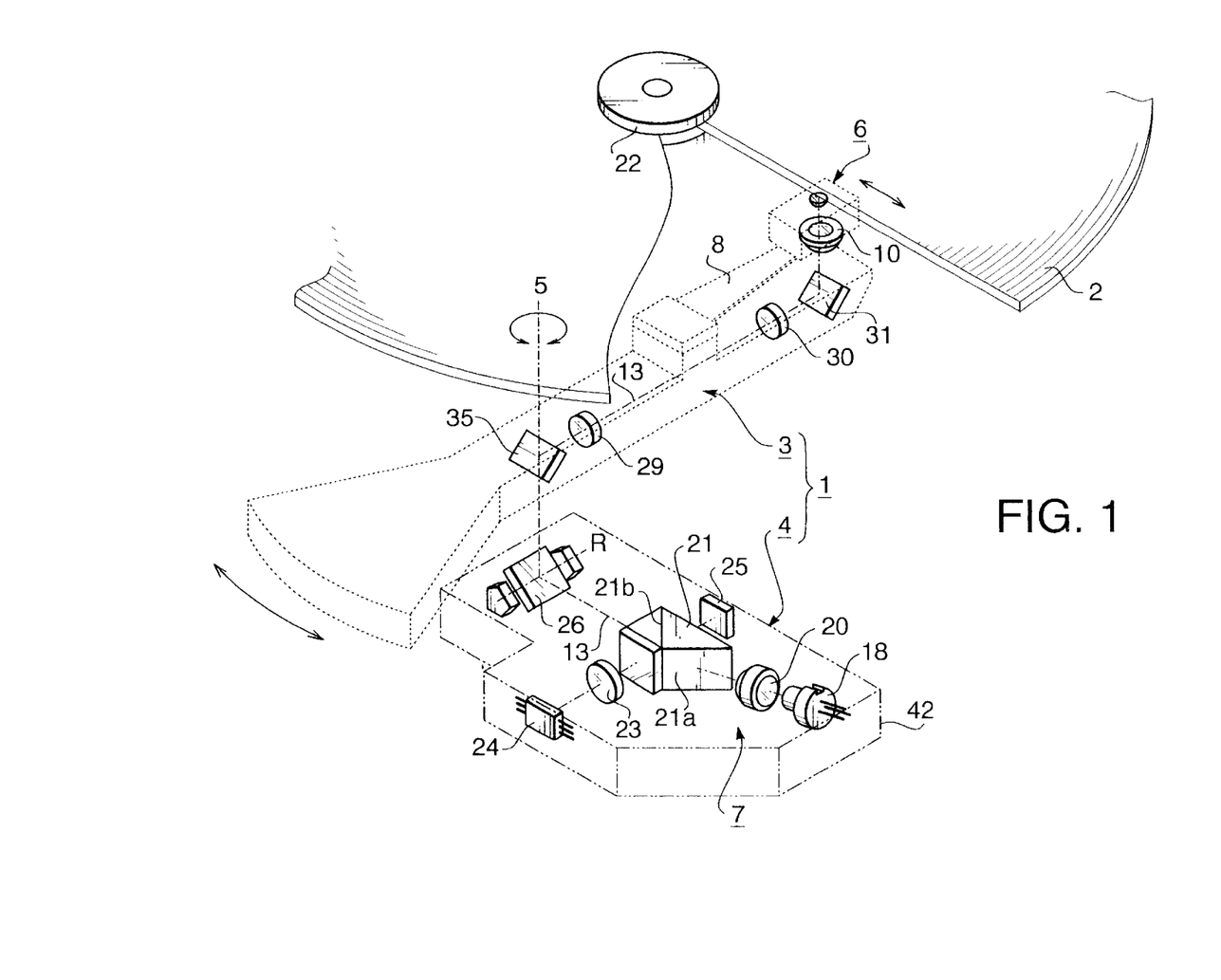
FIG. 1 is a perspective view of an optical head according to the first embodiment.

FIG. 1 is a perspective view of an optical disk drive (hereinafter, the disk drive) according to the first embodiment. The disk drive is arranged to write data on and read data from an optical disk 2 by means of a so-called Near Field Recording (NFR) technology.

In the disk drive, the optical disk 2 is mounted on a rotating shaft 22 of a spindle motor. Hereinafter, the direction perpendicular to the optical disk 2 is referred to as a 'vertical' direction. An optical head 1 includes a rotary arm 3 extending in parallel to a surface of the optical disk 2 and a stationary optical unit 4 fixed to a stationary part of the disk drive. The rotary arm 3 is rotatable (about a rotation axis 5) in parallel to the surface of the optical disk 2. A floating optical unit 6 that carries an object lens (described later) is provided to a tip of the rotary arm 3. When the rotary arm 3 is rotated, the floating optical unit 6 moves across tracks on the optical disk 2. The stationary optical unit 4 includes a light source module 7 which emits laser beam.

Figure 2:
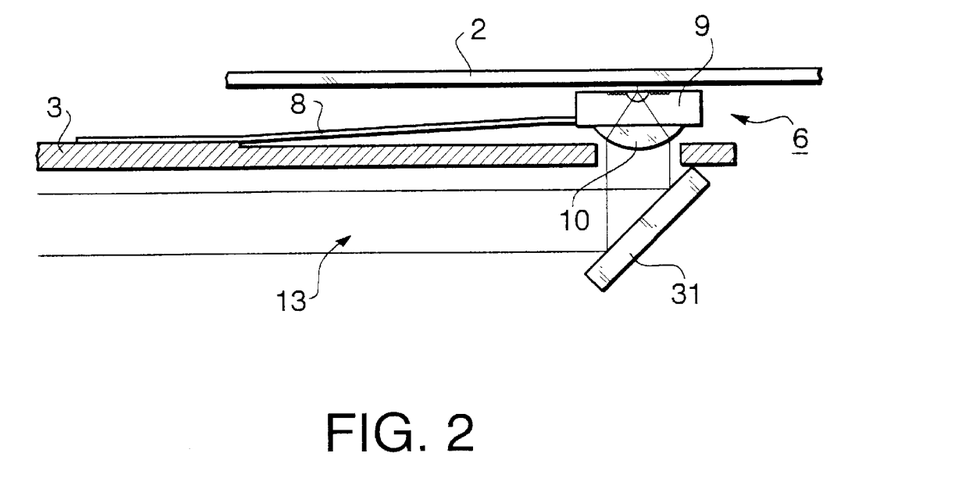
FIG. 2 is an enlarged view of the tip of a rotary arm of the optical disk of FIG. 1.
Figure 3:
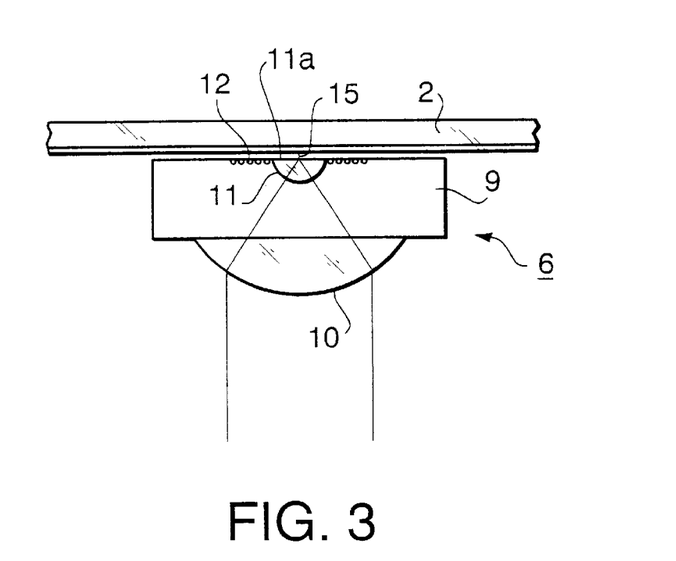
FIG. 3 is an enlarged view of a floating optical unit of the optical disk of FIG. 1.

FIG. 2 is an enlarged view of the tip of the rotary arm 3. FIG. 3 is an enlarged view of the floating optical unit 6. As shown in FIG. 2, the floating optical unit 6 is mounted to the tip of the rotary arm 3 via a flexure beam 8. One end of the flexure beam 8 is fixed to the top of the rotary arm 3, while the floating optical unit 6 is fixed to the other end of the flexure beam 8. When the optical disk 2 rotates, the floating optical unit 6 is shifted downward by air flow generated between the optical disk 2 and the floating optical unit 6. When the floating optical unit 6 is shifted downward, the flexure beam 8 is elastically deformed, which urges the floating optical unit 6 upward. With this, the floating amount of the floating optical unit 6 is kept constant, due to the balance of the downward force (caused by the air flow) and the upward force (caused by the deformation of the flexure beam 8).

As shown in FIGS. 2 and 3, the floating optical unit 6 includes an objective lens 10 and a solid immersion lens (SIL) 11. A reflection mirror 31 is provided to the rotary arm 3, which reflects the laser beam 13 emitted from the light source module 7 (FIG. 1) to the objective lens 10. The objective lens 10 converges the laser beam 13. The solid immersion lens 11 is a hemispherical lens and the plane surface thereof is faced with the optical disk 2. Further, the focal point of the objective lens 10 is positioned on the plane surface of the solid immersion lens 11. That is, the laser beam 13 is converged on the plane surface 11a of the solid immersion lens 11. Since the clearance of the optical disk and the plane surface 11a of the solid immersion lens 11 is less than 1 $\mu$m, the converged laser beam is converted to a so-called evanescent beam 15 (which propagates across a small gap between closely disposed surfaces) and reaches the optical disk 2. Since the beam diameter of the evanescent beam 15 is smaller than the converged laser beam, a data storage capacity can be remarkably increased. The evanescent beam is disclosed in B. D. Terris, H. J. Mamin, and D. Rugar "Near-field optical data storage", Appl. Phys. Lett., Vol. 68, No. 2, Jan. 8, 1996, teaching of which is incorporated by reference in its entirety.

In order to apply magnetic field on the surface of the optical disk 2, a coil 12 is provided around the solid immersion lens 11. A current flow in the coil 12 generates a magnetic field in which the optical disk 2 is positioned. Data writing is performed by the evanescent beam 15 from the solid immersion lens 11 and the magnetic field generated by the coil 12.

Figure 4:
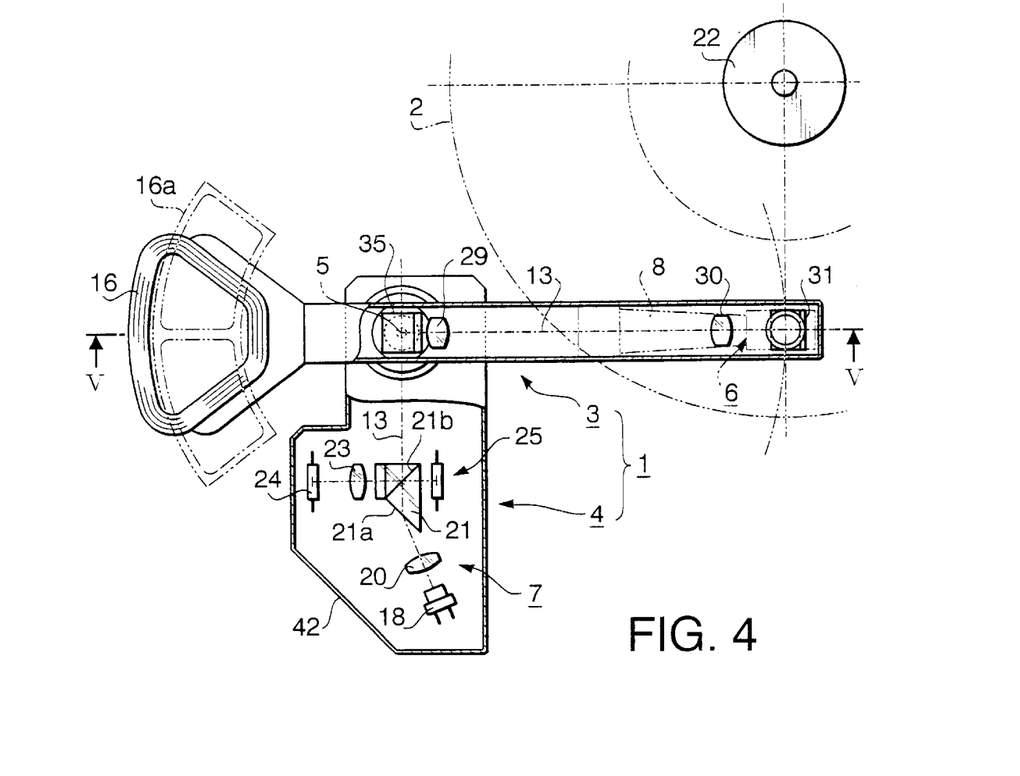
FIG. 4 is a plan view of the optical head of FIG. 1.
Figure 5:
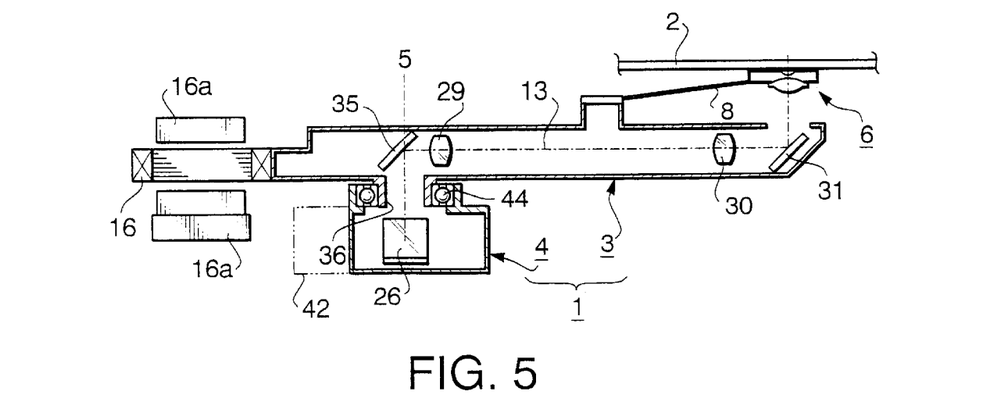
FIG. 5 is a longitudinal sectional view of the optical head of FIG. 4.

FIGS. 4 and 5 are a plan view of the optical head 1 and a longitudinal sectional view taken along line V—V in FIG. 1. As shown in FIG. 5, the rotary arm 3 has a hollow center shaft 36. The center shaft 36 is supported by a housing 42 of the stationary optical unit 4 (via a bearing 44), so that the rotary arm 3 is rotatable about the rotation axis 5. The rotary arm 3 is provided with a driving coil 16 at an opposing end to the floating optical unit 6. The driving coil 16 is inserted in a magnetic circuit 16a provided to a stationary part of the optical disk drive. The driving coil 16 and the magnetic circuit 16a constitute a voice coil motor. By causing current to flow in the driving coil 16, the rotary arm 3 is rotated about the axis 5 due to the electromagnetic induction.

As shown in FIG. 4, the light source module 7 includes a semiconductor laser 18, a collimator lens 20 and a composite prism assembly 21. Further, the light source module 7 includes a laser power monitor sensor 25, a converging lens 23, and a data/tracking detection sensor 24. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 25. The laser power monitor sensor 25 detects the intensity of the incident laser beam. The output from the laser power monitor sensor 25 is sent to a power control circuit (not shown) so as to stabilize the power of the semiconductor laser 18. The laser beam (hereinafter, denoted by 13) that has passed through the half mirror surface 21b proceeds out of the light source module 7.

As shown in FIG. 5, in order to introduce the laser beam 13 (emitted by the light source module 7) to the rotary arm 3, an introducing mirror 26 is provided to the stationary optical unit 4. The introducing mirror 26 reflects the laser beam 13 from the light source module 7 in the vertical direction. The vertically reflected laser beam 13 is introduced into the rotary arm 3 through the hollow center shaft 36. The rotary arm 3 is provided with a directing mirror 35 which reflects laser beam 13 (from the introducing mirror 26) horizontally, so that the laser beam proceeds in the rotary arm 3. The introducing mirror 26 and the directing mirror 35 are positioned on the rotation axis 5 of the rotary arm 3. Further, the light pass through which the reflected laser beam 13 is incident on the directing mirror 35 is aligned with the rotation axis 5 of the rotary arm 3. The laser beam 13 proceeds through first and second relay lenses 29 and 30 (detailed later) to reach the reflection mirror 31 and is reflected toward the floating optical unit 6. Then, the laser beam 13 is converged and incident on the optical disk 2.

Figure 6:
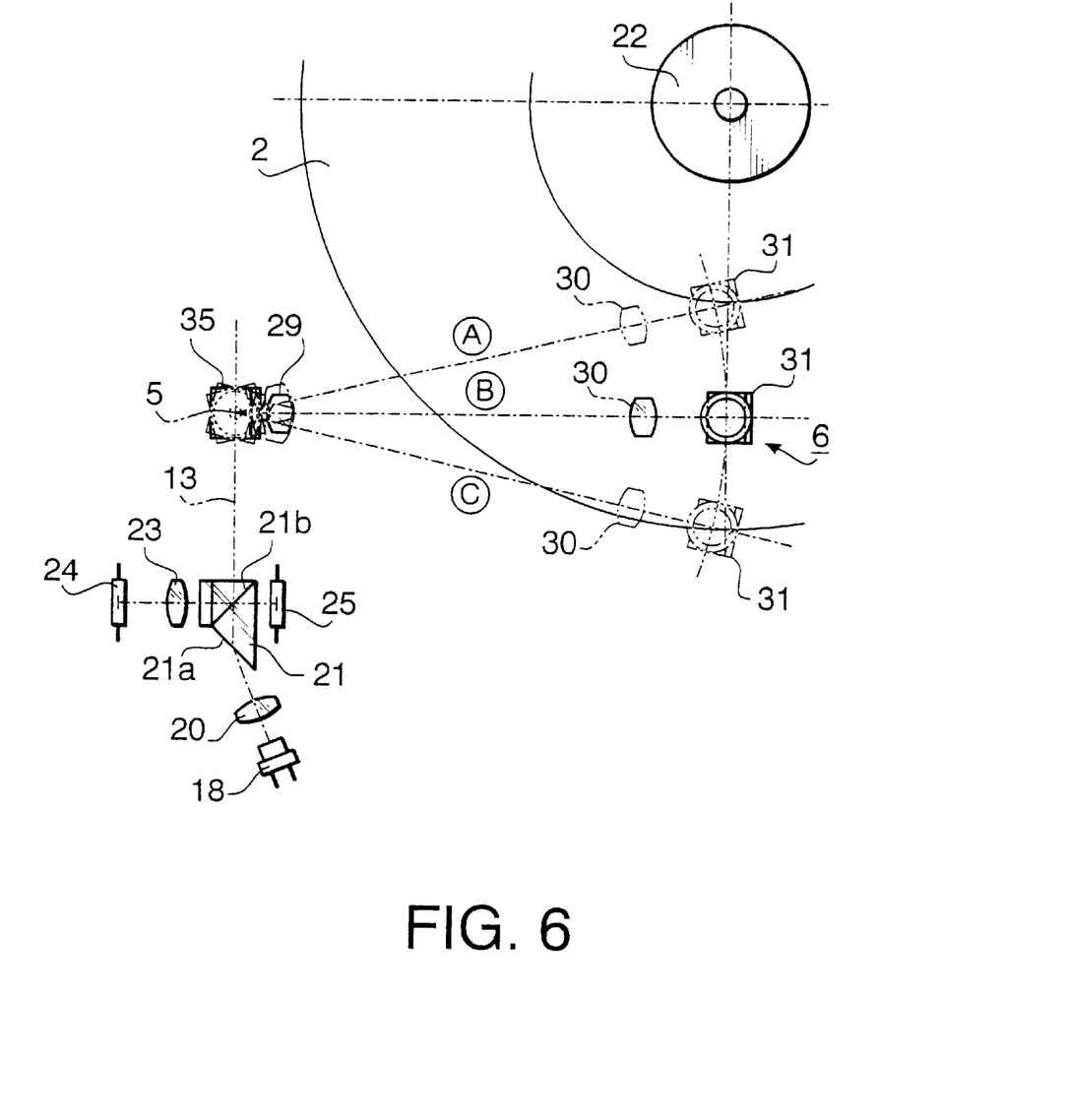
FIG. 6 is a plan view showing an optical system of the optical head of FIG. 4.

FIG. 6 is a schematic view showing an optical system of the disk drive device. Since the light path through which the laser beam 13 is incident on the directing mirror 35 is aligned with the rotation axis 5 of the rotary arm 3, the laser beam 13 proceeds in the rotary arm 3 irrespective of the rotational position of the rotary arm 3 as indicated by A, B and C in FIG. 6.

The laser beam 13 that has returned from the surface of the optical disk 2 travels through the floating optical unit 6, the relay lenses 30 and 29 and the introducing mirror 26. Then, the laser beam 13 enters the composite prism assembly 21 and is reflected by the half mirror surface 21b to the data/tracking detection sensor 24. The reflected laser beam is converged on the data/tracking detection sensor 24 via the converging lens 23. The data/tracking detection sensor 24 is a composite-type sensor that is arranged to read data recorded on the optical disk 2 and to output a track error signal based on the incident laser beam. In particular, the data signal from the data/tracking detection sensor 24 is generated by a not-shown amplifier circuit and sent to a not-shown control circuit.

Next, the tracking operation is described. The tracking operation includes two steps: (1) a rough tracking and (2) a fine tracking. The rough tracking is accomplished by the rotation of the rotary arm 3. The fine tracking operation is accomplished by minutely moving the light spot on the optical disk 2. The introducing mirror 26 is a so-called galvano mirror. By rotating the introducing mirror 26, the incident angle of the laser beam 13 on the objective lens 10 is changed, so that the light spot on the optical disk 2 is moved. The rotating angle of the introducing mirror 26 is detected by a galvano mirror positioning sensor located in the vicinity of the introducing mirror 26.

When the introducing mirror 26 rotates to change the incident angle of the laser beam 13 on the objective lens 10, there is a possibility that the laser beam 13 partially fails to enter the objective lens 10. In order to solve this problem, the first and second relay lenses 29 and 30 are provided between the introducing mirror 26 and the reflection mirror 31 to obtain the conjugate relationship between a principal plane of the objective lens 10 and the rotation axis of the mirror surface of the introducing mirror 26. With this, the laser beam 13 reflected by the introducing mirror 26 is surely enter the objective lens 10 irrespective of the rotating of the introducing mirror 26.

As constructed above, according to the first embodiment, since the light source module 7 is provided in the stationary optical unit 4, the rotary arm 3 is lightened. It is advantageous in improving the accessing speed of the optical head 1.

Figure 7:
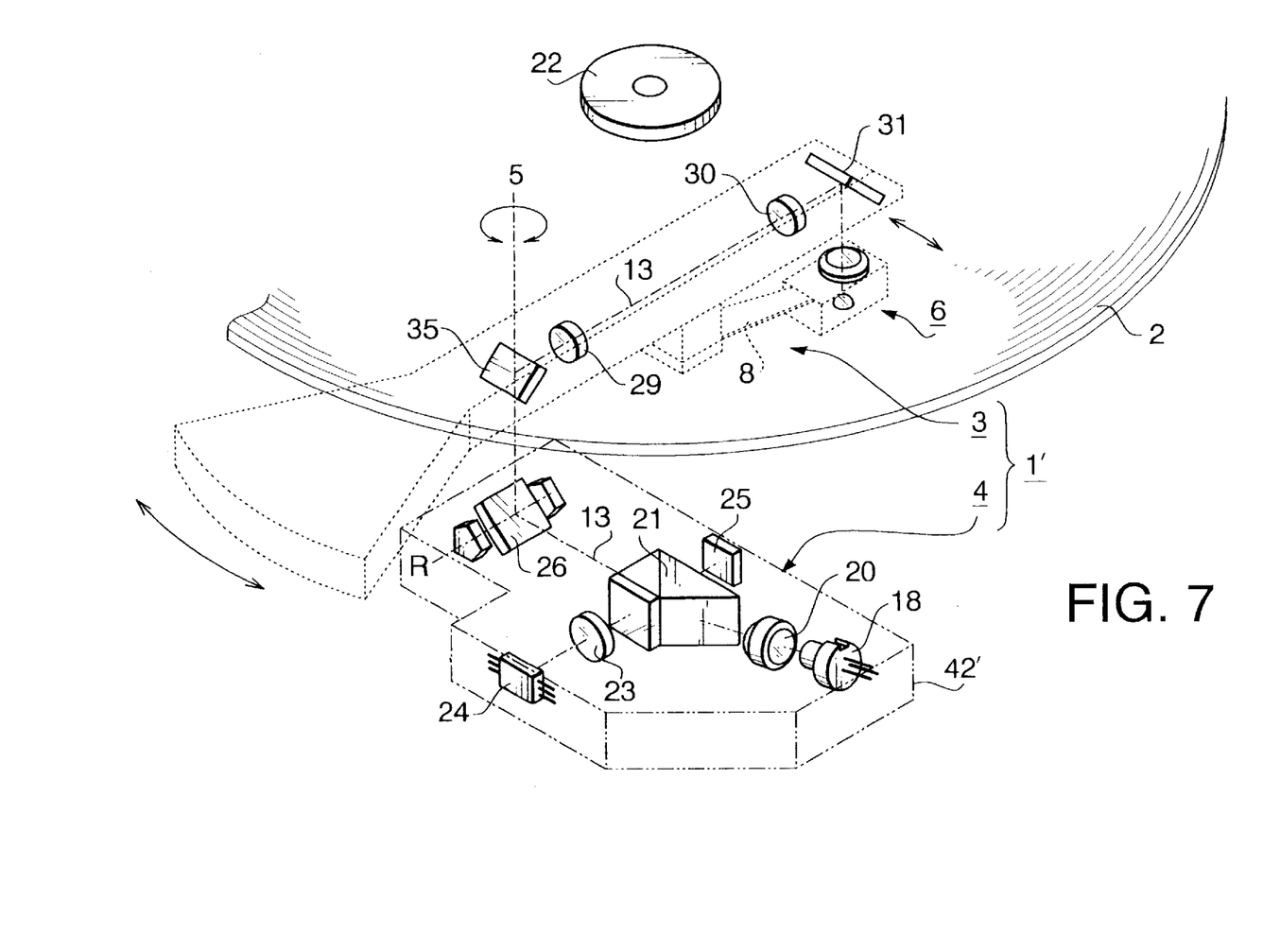
FIG. 7 is a perspective view showing an alternative arrangement of the optical head of the first embodiment.
Figure 8:
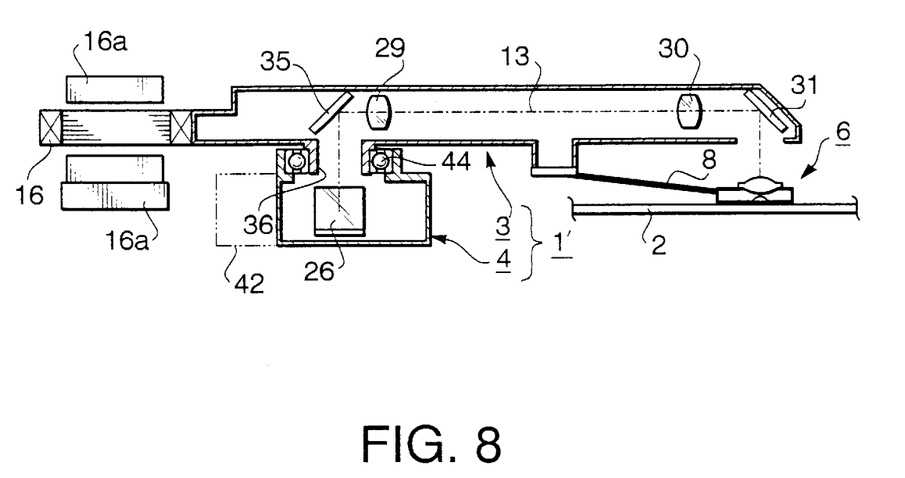
FIG. 8 is a longitudinal sectional view of the optical head of FIG. 7.

FIGS. 7 and 8 are a perspective view and a longitudinal sectional view of the alternative arrangement of the first embodiment. The parts same as those in the first embodiment carry the same reference numerals as the explanation thereof is omitted. As shown in FIG. 7, an optical head 1' of the alternative arrangement is arranged to write data on and read data from the upper surface of the optical disk 2. The rotary arm 3 is provided with the floating optical unit 6 at the bottom thereof. As shown in FIG. 8, the stationary optical unit 4 is located at the same side of the rotary arm 3 as the optical disk 2. The laser beam 13 reflected by the directing mirror 35 proceeds through the relay lenses 29 and 30, reflected by the reflection mirror 31 to the object lens 10 and converged on the upper surface of the optical disk 2. According to this alternative arrangement, since the stationary optical unit 4 and the rotary arm 3 are located at the same side of the optical disk 2, the vertical size of the optical head 1' can be compact.

Figure 9:
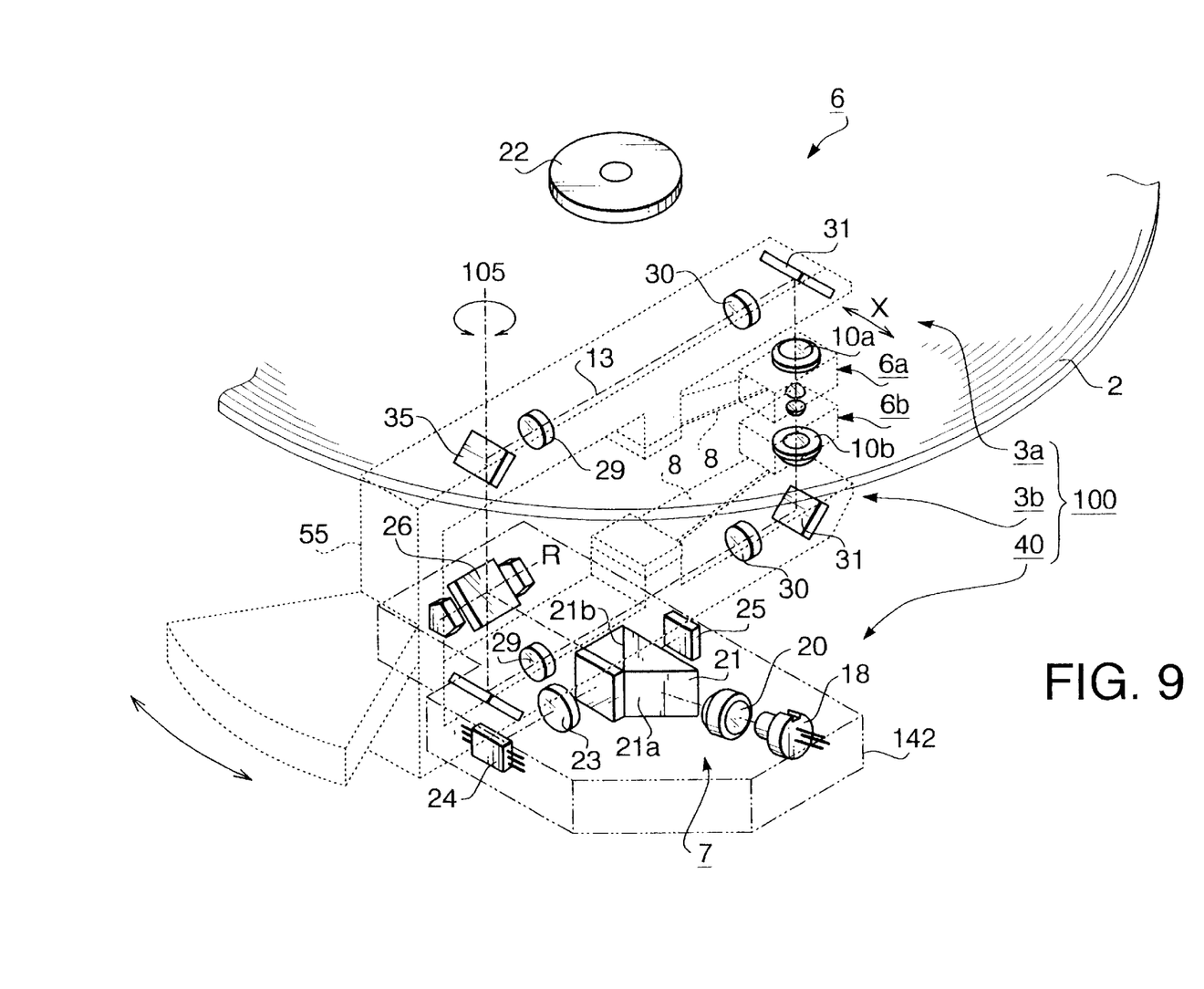
FIG. 9 is a perspective view of an optical head according to the second embodiment.

The second embodiment of the present invention is described. FIG. 9 is a perspective view of an optical head according to the second embodiment. The parts same as those in the first embodiment carry the same reference numerals as the explanation thereof is omitted. In the second embodiment, a 'double-sided' optical disk 2a is used.

The optical head 100 includes a pair of rotary arms 3a and 3b and a stationary optical unit 40. The stationary optical unit 40 is fixed to a stationary part of an optical disk drive. The rotary arms 3a and 3b are parallel to the optical disk 2a. The rotary arms 3a and 3b carry optical elements as the rotary 3 of the first embodiment. In particular, the rotary arms 3a and 3b are provided with floating optical units 6a and 6b carrying object lenses 10a and 10b respectively at the bottom and top thereof. The floating optical units 6a and 6b moves along the upper and lower surfaces of the optical disk 2a, according to the rotation of the optical disk 2a. The structures of the floating optical units 6a and 6b are the same as the floating optical unit 6 (FIGS. 2 and 3) of the first embodiment.

Figure 10:
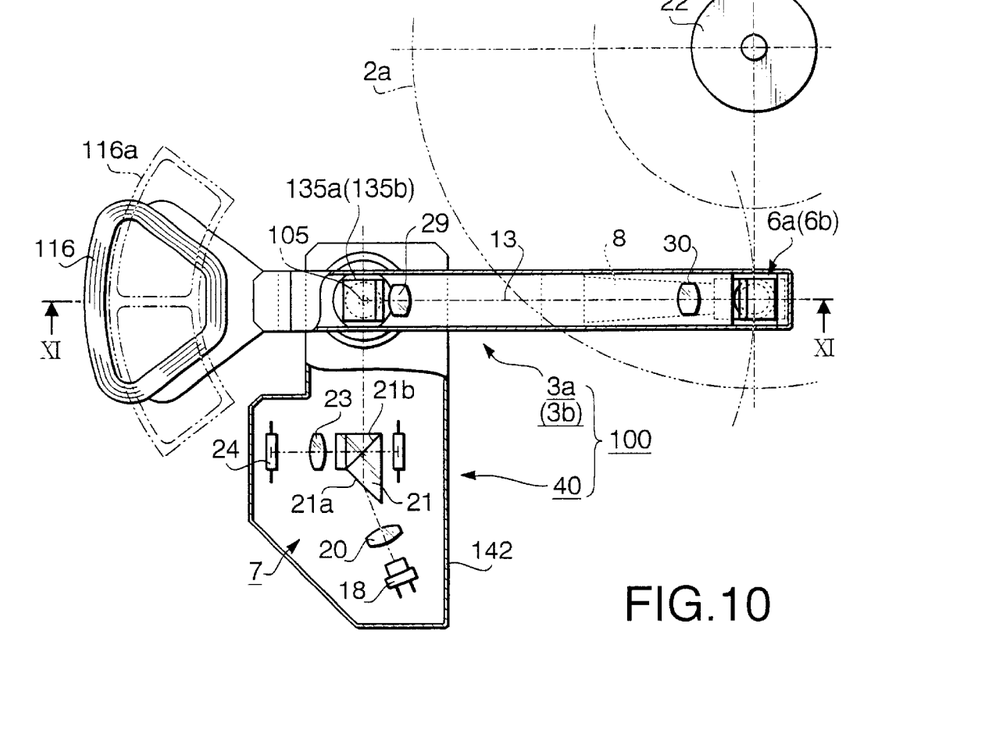
FIG. 10 is a plan view showing the optical head of FIG. 9.
Figure 11:
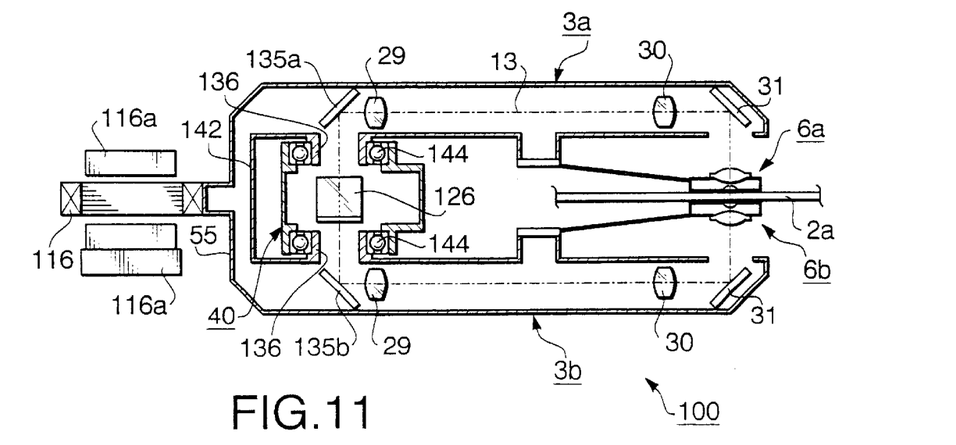
FIG. 11 is a longitudinal sectional view showing the optical head of FIG. 9.

FIGS. 10 and 11 are a plan view of the optical head 100 and a longitudinal sectional view taken along line IX—IX in FIG. 10. As shown in FIG. 11, the rotary arms 3a and 3b have hollow center shafts 136 aligned with each other. The center shafts 136 are supported by top and bottom of a housing 142 of the stationary optical unit 40 (via a bearing 144), so that the rotary arm 3a and 3b are rotated about a rotation axis 105.

The ends of the rotary arms 3a and 3b (opposing to the floating optical units 6a and 6b) are connected with each other by the vertically extending protion 55. The vertically extending portion 55 is provided with a driving coil 116. The driving coil 116 is inserted in a magnetic circuit 116a provided to a stationary part of the disk drive. The driving coil 116 and the magnetic circuit 116a constitute a voice coil motor. By causing current to flow in the driving coil 116, the rotary arms 3a and 3b are rotated about the axis 105 due to the electromagnetic induction.

The stationary optical unit 40 includes the light source module 7 which is the same as that of the first embodiment. The stationary optical unit 40 further includes a switching mirror 26 for selectively introducing the laser beam 13 from the light source module 7 to one of the rotary arms 3a and 3b. When the switching mirror 126 reflects the laser beam 13 upward, the laser beam 13 from the light source module 7 is introduced into the upper rotary arm 3a. When the switching mirror 126 reflects the laser beam downward, the laser beam 13 from the light source module 7 is introduced into the lower rotary arm 3b. The mechanism for driving the switching mirror 126 is detailed later.

The rotary arms 3a and 3b are provided with directing mirrors 135a and 135b on the rotation axis thereof. The directing mirrors 135a and 135b reflect laser beam (from the switching mirror 126) in the longitudinal direction of the rotary arms 3a and 3b. In the upper rotary arm 3a, the laser beam 13 proceeds through the relay lenses 29 and 30, reflected downward by the reflection mirror 31 toward the floating optical unit 6a and incident on the upper surface of the optical disk 2a. In the lower rotary arm 3b, the laser beam 13 proceeds the relay lenses 29 and 30, reflected upward by the reflection mirror 31 toward the floating optical unit 6b and incident on the lower surface of the optical disk 2a.

Since the light path through which the laser beam 13 proceeds from the introducing mirror 126 to the directing mirror 135a (or 135b) is positioned on the rotation axis 5, the laser beam 13 proceeds in the longitudinal direction of the rotary arm 3a (or 3b), irrespective of the rotational angle of the rotary arm 3a (or 3b). The processing of laser beam 13 returned from the optical disk 2a to the light source module 7 is the same as the first embodiment.

The switching mirror 126 is a so-called galvano mirror. By rotating the switching mirror 126, the incident angle of the laser beam 13 on the objective lens 10a (or 10b) is changed, so that the light spot on the optical disk 2a is moved. The rotating angle of the switching mirror 126 is detected by a galvano mirror positioning sensor located in the vicinity of the switching mirror 126.

Figure 12:
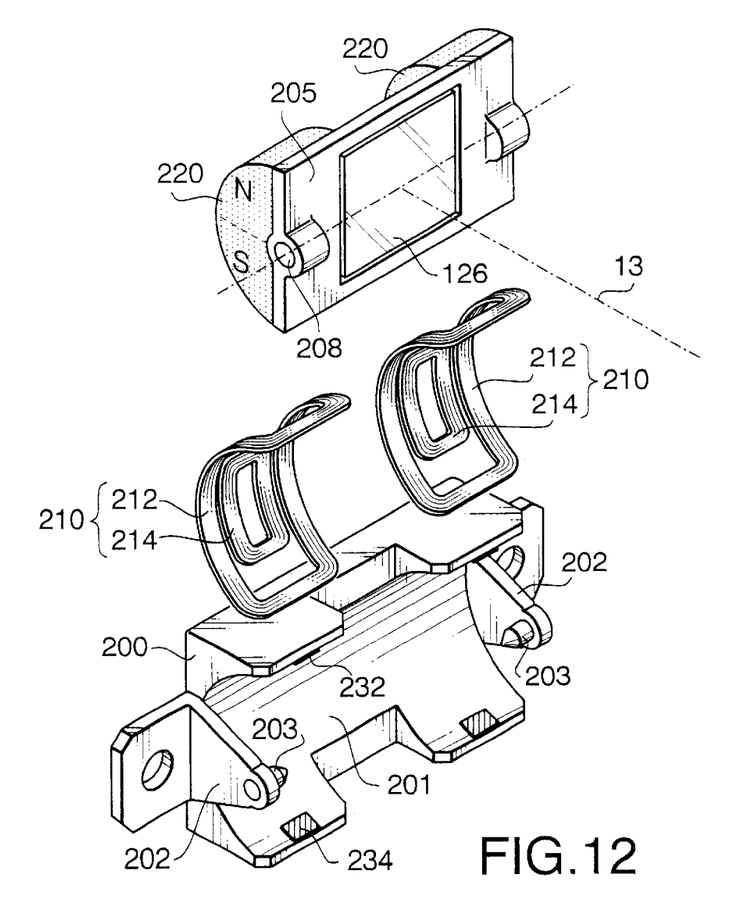
FIG. 12 is an exploded perspective view of a switching mirror arrangement according to the second embodiment.

The driving system of the switching mirror 126 is described. FIG. 12 is an exploded perspective view showing the arrangement for supporting and rotating the switching mirror 126. As shown in FIG. 12, the switching mirror 126 is mounted to a plate-shaped rotatable holder 205. The rotatable holder 205 is rotatably supported by a unit housing 200. The unit housing 200 has two brackets 202 at both sides of the rotatable holder 205. Two center pins 203 are formed on the brackets 202, which sandwich the rotatable holder 205 therebetween. The rotatable holder 205 is provided with two receive members 208 at both side ends, which receive the center pins 203. The center pin 203 has a conically-shaped tip, while the receive member 208 has a recess for receiving the corn-shaped tip of the center pin 203.

Figure 13:
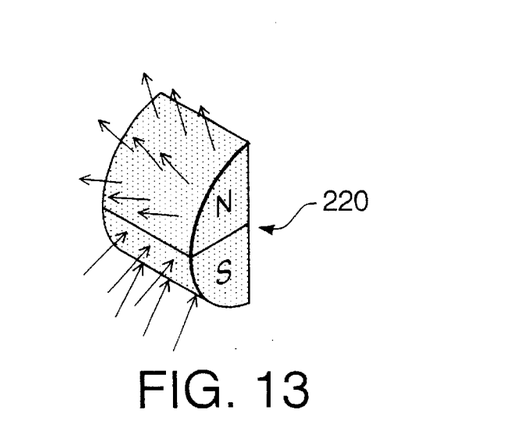
FIG. 13 is a schematic view showing magnetic lines of flux of a magnet of the switching mirror arrangement.

Two semi-circular magnets 220 are provided at both side ends of the rotatable holder 205. Each magnet 220 includes upper and lower parts which are N-pole and P-pole, respectively. Further, as shown in FIG. 12, the magnet 220 is radially magnetized. That is, the magnetic lines of flux are perpendicular to the outer surface of the magnet 220. The unit housing 200 has a curved surface 201 which faces the magnet 220. Coils 210 are attached to both side ends of the curved surface 201 so that the coils 210 are respectively faced with the magnets 220. The coils 210 are so wounded that the coils 210 are perpendicular to the magnetic lines of flux of the magnet 220. Each coil 210 includes inner and outer coils 212 and 214, in which current is able to flow independently.

Figure 14A:
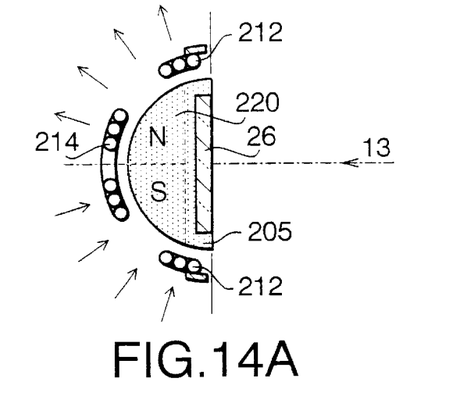
FIGS. 14A through 14F are sectional views showing a rotation of the switching mirror.

FIGS. 14A through 14F show the rotation of the switching mirror 126 (that is, the rotation of the rotatable holder 205). When no current flows in the inner and outer coils 212 and 214, the switching mirror 126 stays at the neutral position as shown in FIG. 14A. In this state, the laser beam 13 (emitted by the light source module 7) is perpendicular to the surface of the switching mirror 126, as shown in FIG. 15A.

Figure 14B:
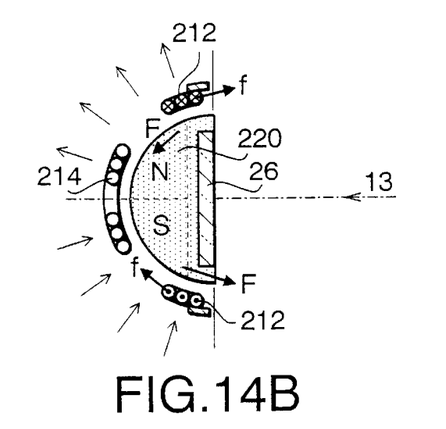
Figure 15A:
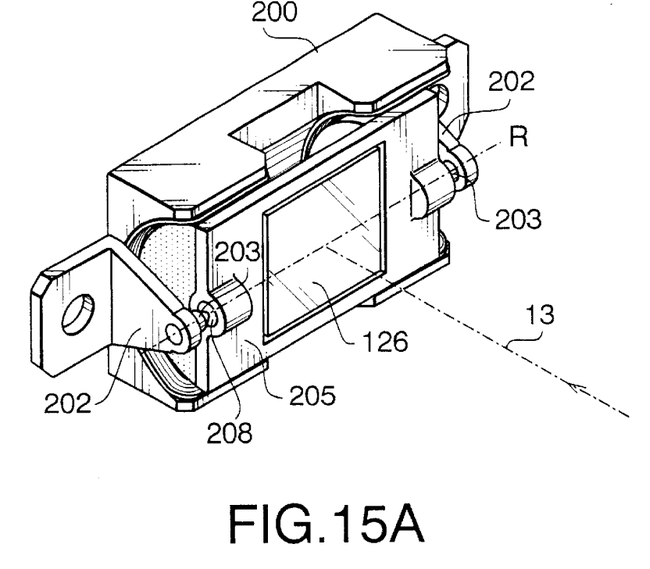
FIGS. 15A and 15B are perspective views of switching mirror.

In order to direct the switching mirror 126 upward, as shown in FIG. 14B, current is caused to flow in outer coil 212 (clockwise in FIG. 12). With this, due to the electromagnetic force between the magnet 220 and the outer coil 212, the magnet 220 is urged to rotate counterclockwise in FIG. 14B.

Figure 14C:
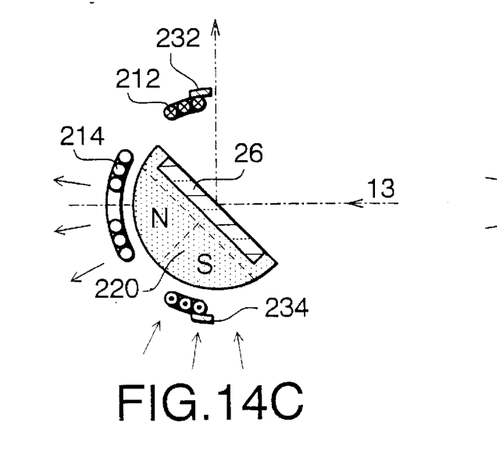
Figure 14D:
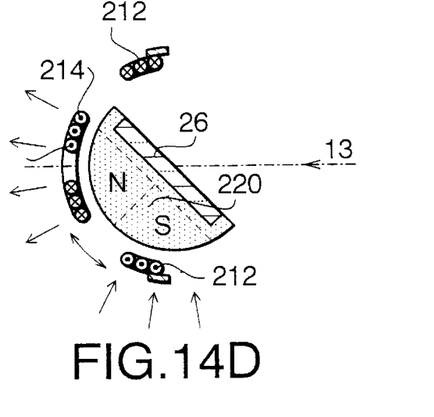
Figure 15B:
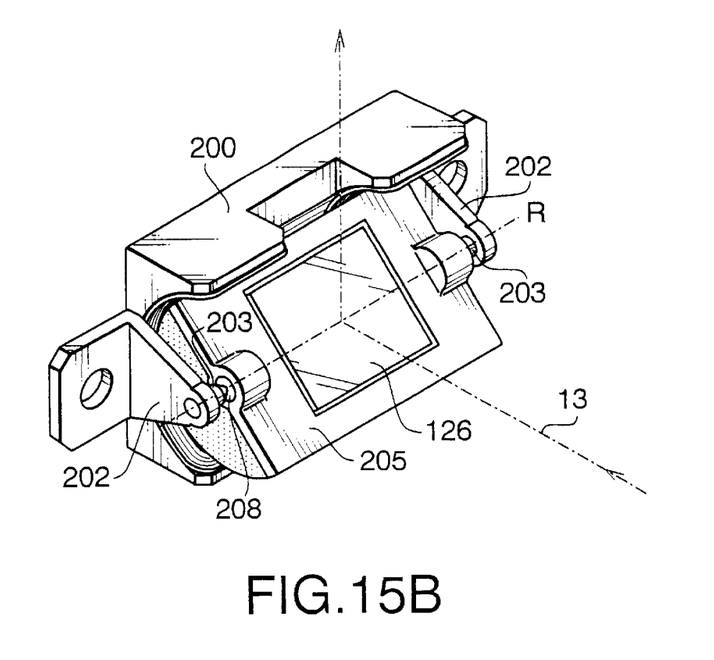

In order to stop the rotation of the switching mirror 126 at certain positions, two magnetized members 232 and 234 are provided at top and bottom portions of the curved surfaces 201 (FIG. 12). As shown in FIG. 14C, S pole of the magnet 220 attracts the magnetized member 234 so that the rotation of the switching mirror 126 is stopped. The position of the lower magnetized member 234 is determined so that the switching mirror 126 is stopped where the switching mirror 126 reflects the laser beam upward by 90 degrees, as shown FIG. 15B. With this, the laser beam 13 is introduced into the upper rotary arm 3a. In this state, by allowing current to flow in the inner coil 214, the switching mirror 126 can be rotated by a small amount, as shown in FIG. 14D. With this, the incident angle of the laser beam 13 on the objective lens 10a (or 10b) (FIG. 11) is changed, so that the light spot on the optical disk 2 is moved. That is, the fine tracking operation is performed. The rotating angle of the switching mirror 126 is detected by a not-shown sensor located in the vicinity of the switching mirror 126.

Figure 14E:
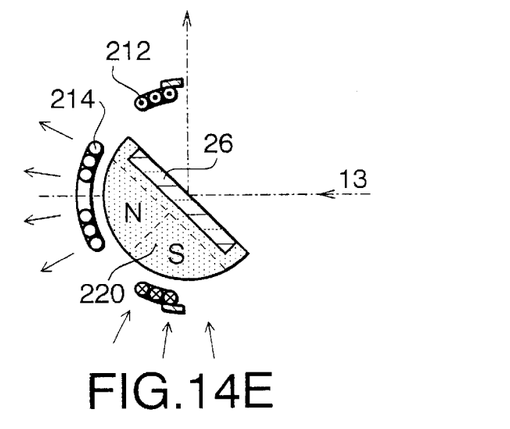
Figure 14F:
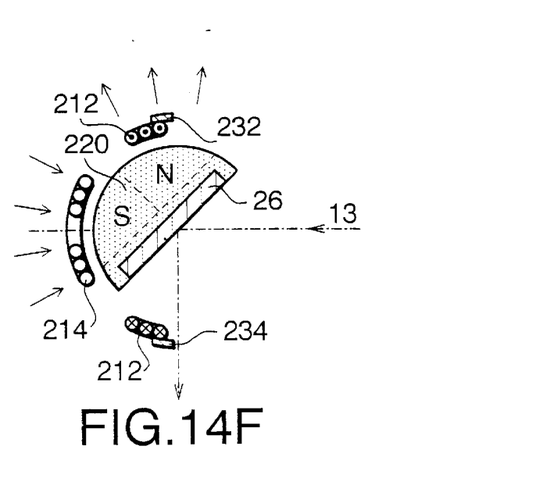

In order to direct the switching mirror 126 downward, as shown in FIG. 14E, current is caused to flow in the outer coil 212 counterclockwise in FIG. 11. With this, due to the electromagnetic force between the magnet 220 and the outer coil 212, the magnet 220 is urged to rotate clockwise in FIG. 14E. As shown in FIG. 14F, the N-pole of the magnet 220 attracts the magnetized member 232 so that the rotation of the switching mirror 126 is stopped. The position of the lower magnetized member 234 is determined so that the switching mirror 126 is stopped where the switching mirror 126 reflects the laser beam downward by 90 degrees. With this, the laser beam is introduced into the lower rotary arm 3b. In this state, by allowing current to flow in the inner coil 214, the switching mirror 126 can be rotated by a small amount, so that the fine tracking operation is performed.

As described above, according to the second embodiment, a common light source module 7 can be used for two rotary arms 3a and 3b. Thus, the rotary arms 3a and 3b are lightened. Also, compared with a conventional optical head in which two light source modules are mounted on two rotary arms, the number of optical element is reduced.

Although the optical head of the present invention is described herein with respect to the preferred embodiments, many modifications and changes can be made without departing from the spirit and scope of the invention.

The present disclosure relates to subject matters contained in Japanese Patent Application Nos. HEI 9-368021, filed on Dec. 27, 1997 and HEI 9-368022, filed on Dec. 27, 1997 which are expressly incorporated herein by reference in their entirety.

What is claimed is:

1. An optical head used in an optical disk drive in which an optical disk is rotatably supported, said optical head comprising:
    a stationary optical unit fixed to a stationary part of said optical disk drive, said stationary optical unit including a light source module which emits light;
    a rotary arm that is rotatable along said optical disk, said rotary arm carrying an object lens which converges said light on said optical disk;
    a light-introducing system which introduces said light from said light source module to said rotary arm so that said light travels along said rotary arm to reach said object lens, said light introducing system comprising a first reflection mirror mounted for rotation and provided to said stationary optical unit, which reflects said light from said light source module toward said rotary arm and a second reflection mirror provided to said rotary arm, which reflects said light from said first reflection mirror toward said object lens, wherein a light path between said first and second reflection mirrors is aligned with a rotation axis of said rotary arm.

2. The optical head according to claim 1, wherein said stationary optical unit includes a light receiving unit which receives returning light which has been reflected by said optical disk.

3. The optical head according to claim 1, wherein said first reflection mirror is rotatable about an axis on a reflection surface of said first reflection mirror,
    wherein an incident angle of light on said object lens is varied by a rotation of said first reflection mirror, so that a fine tracking operation is performed.

4. The optical head according to claim 3, wherein said rotary arm carries at least two relay lenses, and wherein said relay lenses are provided between said first reflection mirror and said object lens to obtain a conjugate relationship between a principal plane of said objective lens and a rotation axis of said first reflection mirror.

5. The optical head according to claim 1, wherein said rotary arm is positioned between said stationary optical unit and said optical disk in the direction of a rotation axis of said rotary arm.

6. The optical head according to claim 1, wherein said rotary arm and said stationary optical unit are located at the same side of said optical disk.

7. The optical head according to claim 1, wherein said rotary arm is supported by a housing of said stationary optical unit.

8. The optical head according to claim 1, said optical head comprising a pair of said rotary arms which are rotatable along with each other, and said light-introducing system is further arranged to selectively direct said light from light source module to one of said pair of rotary arms.

9. An optical head used in an optical disk drive in which an optical disk is rotatably supported, said optical head comprising:

an optical unit including a light source module which emits light;

at least a pair of rotary arms rotatable along said optical disk, each of said rotary arms carrying an object lens which converges said light on said optical disk; and a switching system which selectively introduces said light from said light source module to one of said pair of rotary arms, so that said light travels along the selected rotary arm to reach said object lens of said selected rotary arm, wherein said optical unit is disposed between said pair of rotary arms in a direction of a rotation axis of said pair of rotary arms.

10. The optical head according to claim 9, wherein said optical unit is fixed to a stationary part of said optical disk drive.

11. The optical head according to claim 10, wherein said pair of said rotary arms are mounted in a common rotatable carriage.

12. The optical head according to claim 9, said light-switching system comprising:

a first reflection mirror provided to said optical unit, which reflects said light from said light source module toward one of said rotary arms; and second reflection mirrors respectively provided to said rotary arms, each of which is able to reflect said light from said first reflection mirror to a direction along a longitudinal direction of said rotary arm.

13. The optical head according to claim 12, wherein light paths between said first reflection mirror and each of said second reflection mirrors are aligned with a rotation axis of said rotary arms.

14. The optical head according to claim 12, wherein a selection of said rotary arms is accomplished by changing an orientation of said first reflection mirror.

15. The optical head according to claim 12, wherein said first reflection mirror is rotatable about an axis located on a reflection surface of said first reflection mirror, and wherein an incident angle of light on said object lens is varied by a rotation of said first reflection mirror, so that a fine tracking operation is performed.

16. The optical head according to claim 15, wherein each of said rotary arms carries at least two relay lenses, and wherein said relay lenses are provided between said first reflection mirror and said object lens to obtain a conjugate relationship between a principal plane of said objective lens and a rotation axis of said first reflection mirror.

17. An optical head used in an optical disk drive in which an optical disk is rotatably supported, said optical head comprising:

an optical unit including a light source module which emits light;

at least a pair of rotary arms rotatable along said optical disk, each of said rotary arms carrying an object lens which converges said light on said optical disk;

a switching system which selectively introduces said light from said light source module to one of said rotary arms, so that said light travels along the selected rotary arm to reach said object lens of said selected rotary arm, said switching system comprising a first reflection mirror provided to said optical unit, which reflects said light from said light source module toward one of said rotary arms and second reflection mirrors respectively provided to said rotary arms, each of which is able to reflect said light from said first reflection mirror to extend in a direction along a longitudinal direction of said rotary arm, wherein said first reflection mirror is rotatable about an axis located on a reflection surface of said first reflection mirror, and wherein an incident angle of light on said object lens is varied by a rotation of said first reflection mirror, so that a fine tracking operation is performed.

18. The optical head according to claim 17, wherein said optical unit is disposed between said pair of rotary arms in a direction of a rotation axis of said pair of rotary arms.

* * * * *